US012719599B2

(12) United States Patent
Murakami et al.

(10) Patent No.: US 12,719,599 B2
(45) Date of Patent: Aug. 25, 2026

(54) PROPAGATION MODEL ESTIMATION SYSTEM, PROPAGATION MODEL ESTIMATION DEVICE, AND PROPAGATION MODEL ESTIMATION METHOD

(71) Applicant: NTT, Inc., Tokyo (JP)

(72) Inventors: Tomoki Murakami, Musashino (JP); Ryotaro Taniguchi, Musashino (JP); Tomoaki Ogawa, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 292 days.

(21) Appl. No.: 18/700,582

(22) PCT Filed: Nov. 1, 2021

(86) PCT No.: PCT/JP2021/040272

§ 371 (c)(1), (2) Date: Apr. 11, 2024

(87) PCT Pub. No.: WO2023/073993

PCT Pub. Date: May 4, 2023

(65) Prior Publication Data

US 2024/0413918 A1 Dec. 12, 2024

(51) Int. Cl.
*H04B 17/391* (2015.01)

(52) U.S. Cl.
CPC ................................ *H04B 17/3913* (2015.01)

(58) Field of Classification Search
CPC .. H04B 17/3913; H04B 17/391; H04W 16/18
USPC ...................................................... 455/67.11
See application file for complete search history.

(56) References Cited

U.S. PATENT DOCUMENTS

| | | | | |
|---|---|---|---|---|
| 2012/0027068 | A1 * | 2/2012 | Motoyoshi | H04W 16/18 375/224 |
| 2017/0338901 | A1 * | 11/2017 | Zhihua | H04B 17/3912 |
| 2018/0117845 | A1 * | 5/2018 | Buller | B29C 64/159 |
| 2020/0380563 | A1 * | 12/2020 | Shiffert | H04W 4/023 |
| 2023/0050047 | A1 * | 2/2023 | Maaref | G06N 3/084 |

OTHER PUBLICATIONS

Shinichi, “Establishment of scale model method for radio wave propagation (Grants-in-Aid for Scientific Research),” Kyushu Institute of Technology, Graduate School of Engineering, May 2012, 10 pages (with English translation).

* cited by examiner

*Primary Examiner* — Eugene Yun
(74) *Attorney, Agent, or Firm* — Fish & Richardson P.C.

(57) ABSTRACT

A propagation model estimation system according to an embodiment includes selection circuitry configured to select an area, modeling circuitry configured to model a radio wave reflection, determination circuitry configured to determine a scale ratio of the selected area and a frequency scale model based on the scale ratio, creation circuitry configured to create an area scale model by a 3D printer, arrangement circuitry configured to arrange, in the area scale model, at least one transmitting station that transmits a radio wave based on the frequency scale model and at least one receiving station that receives the radio wave transmitted, measurement circuitry configured to measure a propagation characteristic of the radio wave received, and estimation circuitry configured to estimate the radio wave propagation model on a basis of the measured propagation characteristic of the radio wave.

6 Claims, 5 Drawing Sheets

ESTIMATION OF PROPAGATION MODEL
BY ACTUAL MEASUREMENT
IN ACTUAL TARGET AREA
ESTIMATION OF PROPAGATION MODEL
BY ACTUAL MEASUREMENT IN SCALE MODEL
SCALE MODEL
(FOR EXAMPLE, 1/100)
AREA FOR WHICH RADIO WAVE
PROPAGATION MODEL
IS TO BE ESTIMATED

PROPAGATION MODEL ESTIMATION SYSTEM, PROPAGATION MODEL ESTIMATION DEVICE, AND PROPAGATION MODEL ESTIMATION METHOD

CROSS-REFERENCE TO RELATED APPLICATIONS

This application is a National Stage application under 35 U.S.C. § 371 of International Application No. PCT/JP2021/040272, having an International Filing Date of Nov. 1, 2021. The disclosure of the prior application is considered part of the disclosure of this application, and is incorporated by reference in its entirety into this application.

TECHNICAL FIELD

The present invention relates to a propagation model estimation system, a propagation model estimation device, and a propagation model estimation method.

BACKGROUND ART

Due to the explosive spread of wireless communication devices in recent years, there is an increasing demand for wireless communication. However, since frequency resources are limited, it is necessary to use not only existing frequencies but also frequencies that have not been used so far.

In order to use these frequencies, it is necessary to investigate a propagation characteristic in an area where the frequencies are to be used and an influence of interference on other systems in advance.

Conventionally, the propagation characteristic has been measured and clarified in an actual area, and a propagation model has been formulated by ITU-R (ITU Radiocommunication Sector) by using various measurement results.

However, for an unexplored frequency, sufficient measurement results may not be present, or no propagation model may be formulated. Under such circumstances, a method of creating a scale model of a use area such as a city and measuring a propagation characteristic in the model environment has been proposed (refer to, for example, Non Patent Literature 1).

In addition, in the recent situation where radio waves in the millimeter waveband are increasingly used in urban areas, there are many unknown factors regarding the propagation characteristics of radio waves in the urban areas, and establishment of a method for estimating a propagation model in the urban areas by measurement in the actual areas or the like is required.

CITATION LIST

Non Patent Literature

Non Patent Literature 1: Shinichi Ichitsubo, "Establishment of scale model method for radio wave propagation", Grands-in-Aid for Scientific Research Program (KAKENHI) Research Result [online], May 18, 2012, Form C-19, Internet <URL: https://kaken.nii.ac.jp/ja/file/KAKENHI-PROJECT-21560403/21560403seika.pdf>

SUMMARY OF INVENTION

Technical Problem

However, in the presence of various buildings and obstacles in urban areas, the amount of data that needs to be acquired is enormous particularly in order to estimate a propagation model of a lower layer. In addition, since it is difficult to establish a propagation model by performing measurement in an actual area, there is a strong demand for improving work efficiency by measuring a propagation characteristic in a high frequency band according to a reduction ratio in a laboratory using a scale model (miniature model of an urban area).

Conventionally, a propagation model estimation method using a scale model has been studied, but it takes much time to create a scale model and measure a propagation characteristic. In addition, since the conventional scale model is simplified, the estimation accuracy of the propagation characteristic may be lowered depending on the environment.

The present invention has been made in view of the above-described problems, and an object thereof is to provide a propagation model estimation system, a propagation model estimation device, and a propagation model estimation method capable of easily and accurately estimating a propagation model.

Solution to Problem

A propagation model estimation system according to an embodiment of the present invention includes a selection unit that selects an area for which a radio wave propagation model is to be estimated, a modeling unit that models a radio wave reflection characteristic in the area selected by the selection unit, a determination unit that determines a scale ratio of the area selected by the selection unit, a frequency scale model based on the scale ratio, and at least one material based on the radio wave reflection characteristic modeled by the modeling unit and the frequency scale model, a creation unit that creates an area scale model in which a structure in the area selected by the selection unit is reduced at the scale ratio using the material by means of a 3D printer, an arrangement unit that arranges, in the area scale model, at least one transmitting station that transmits a radio wave based on the frequency scale model and at least one receiving station that receives the radio wave transmitted by the transmitting station while moving, a measurement unit that measures a propagation characteristic of the radio wave received by each of the receiving stations moving in the area scale model, and an estimation unit that estimates the radio wave propagation model on a basis of the propagation characteristic of the radio wave measured by the measurement unit.

Also, a propagation model estimation device according to an embodiment of the present invention includes an arrangement unit that arranges, in an area scale model created by reducing a structure in an area selected as a target for which a radio wave propagation model is to be estimated at a scale ratio using a predetermined material by means of a 3D printer, at least one receiving station that receives, while moving, a radio wave transmitted by at least one transmitting station that transmits the radio wave based on a frequency scale model corresponding to the scale ratio, a measurement unit that measures a propagation characteristic of the radio wave received by each of the receiving stations moving in the area scale model, and an estimation unit that estimates the radio wave propagation model on a basis of the propagation characteristic of the radio wave measured by the measurement unit.

Further, a propagation model estimation method according to an embodiment of the present invention includes a selection process of selecting an area for which a radio wave propagation model is to be estimated, a modeling process of modeling a radio wave reflection characteristic in the selected area, a determination process of determining a scale ratio of the selected area, a frequency scale model based on the scale ratio, and at least one material based on the modeled radio wave reflection characteristic and the frequency scale model, a creation process of creating an area scale model in which a structure in the selected area is reduced at the scale ratio using the material by means of a 3D printer, an arrangement process of arranging, in the area scale model, at least one transmitting station that transmits a radio wave based on the frequency scale model and at least one receiving station that receives the radio wave transmitted by the transmitting station while moving, a measurement process of measuring a propagation characteristic of the radio wave received by each of the receiving stations moving in the area scale model, and an estimation process of estimating the radio wave propagation model on a basis of the measured propagation characteristic of the radio wave.

Further a propagation model estimation method according to another embodiment of the present invention includes a selection process of selecting an area for which a radio wave propagation model is to be estimated, a modeling process of modeling a radio wave reflection characteristic in the selected area, a determination process of determining a scale ratio of the selected area, a frequency scale model based on the scale ratio, and at least one material based on the modeled radio wave reflection characteristic and the frequency scale model, and a creation process of creating an area scale model in which a structure in the selected area is reduced at the scale ratio using the material by means of a 3D printer.

Further, a propagation model estimation method according to another embodiment of the present invention includes an arrangement process of arranging, in an area scale model created by reducing a structure in an area selected as a target for which a radio wave propagation model is to be estimated at a scale ratio using a predetermined material by means of a 3D printer, at least one receiving station that receives, while moving, a radio wave transmitted by at least one transmitting station that transmits the radio wave based on a frequency scale model corresponding to the scale ratio, a measurement process of measuring a propagation characteristic of the radio wave received by each of the receiving stations moving in the area scale model, and an estimation process of estimating the radio wave propagation model on a basis of the measured propagation characteristic of the radio wave.

Advantageous Effects of Invention

According to the present invention, it is possible to easily and accurately estimate a propagation model.

DESCRIPTION OF EMBODIMENTS

Figure 5:
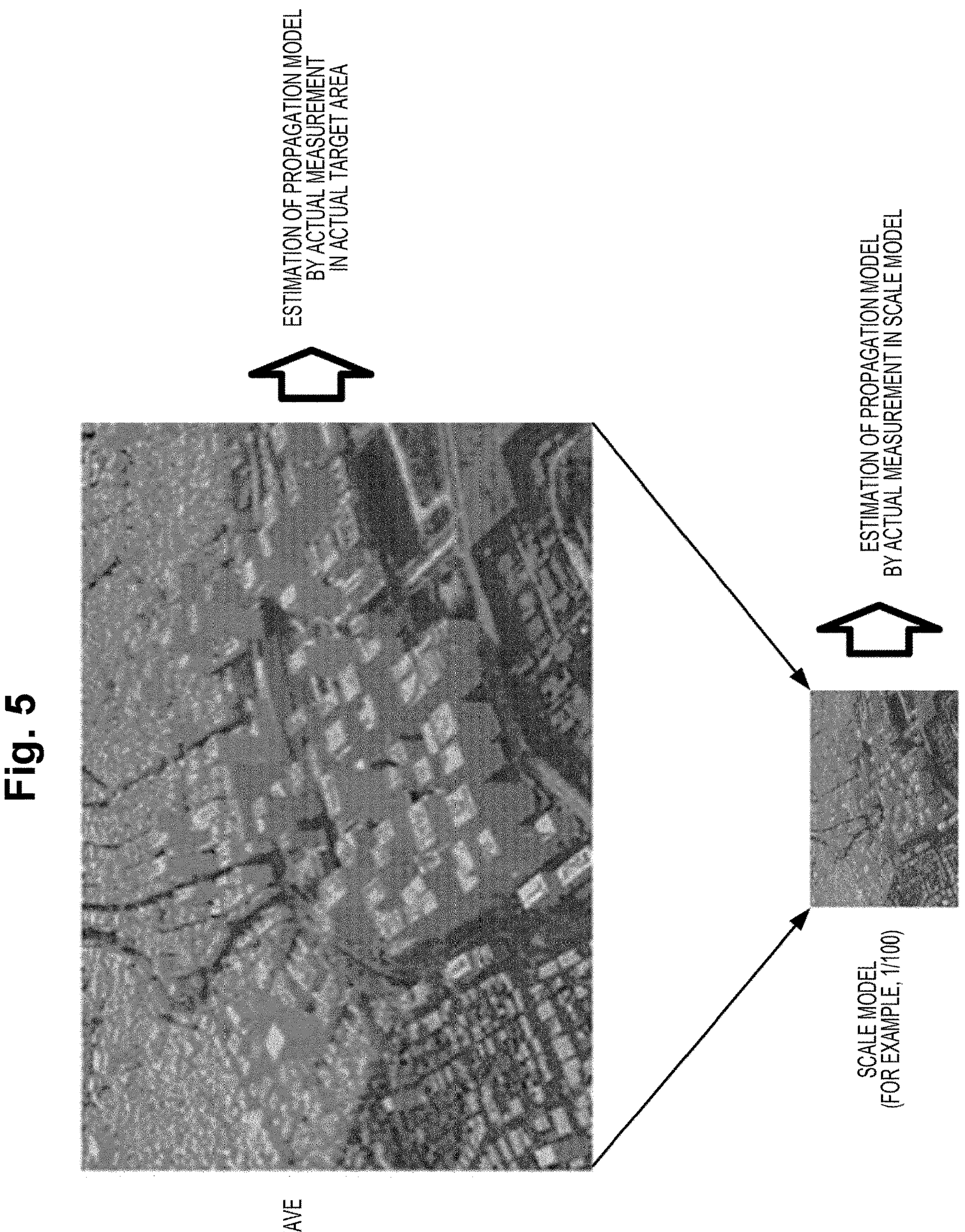
FIG. 5 is a diagram schematically illustrating a propagation model estimation method according to a comparative example.

First, the background of the present invention will be described with reference to FIG. 5. FIG. 5 is a diagram schematically illustrating a propagation model estimation method according to a comparative example.

For an area for which a radio wave propagation model is to be estimated, the propagation model estimation method according to the comparative example is a method for estimating a propagation model by creating a scale model in which the target area is scaled down to 1/100, for example, and performing actual measurement in the scale model instead of estimating a propagation model by actual measurement in the actual target area.

However, in the propagation model estimation method according to the comparative example, it takes much time to create the scale model and measure a propagation characteristic. In addition, since the scale model according to the comparative example is simplified, the estimation accuracy of the propagation characteristic may be lowered depending on the environment.

Therefore, a propagation model estimation system according to an embodiment is configured to easily and accurately estimate a propagation model.

Figure 1:
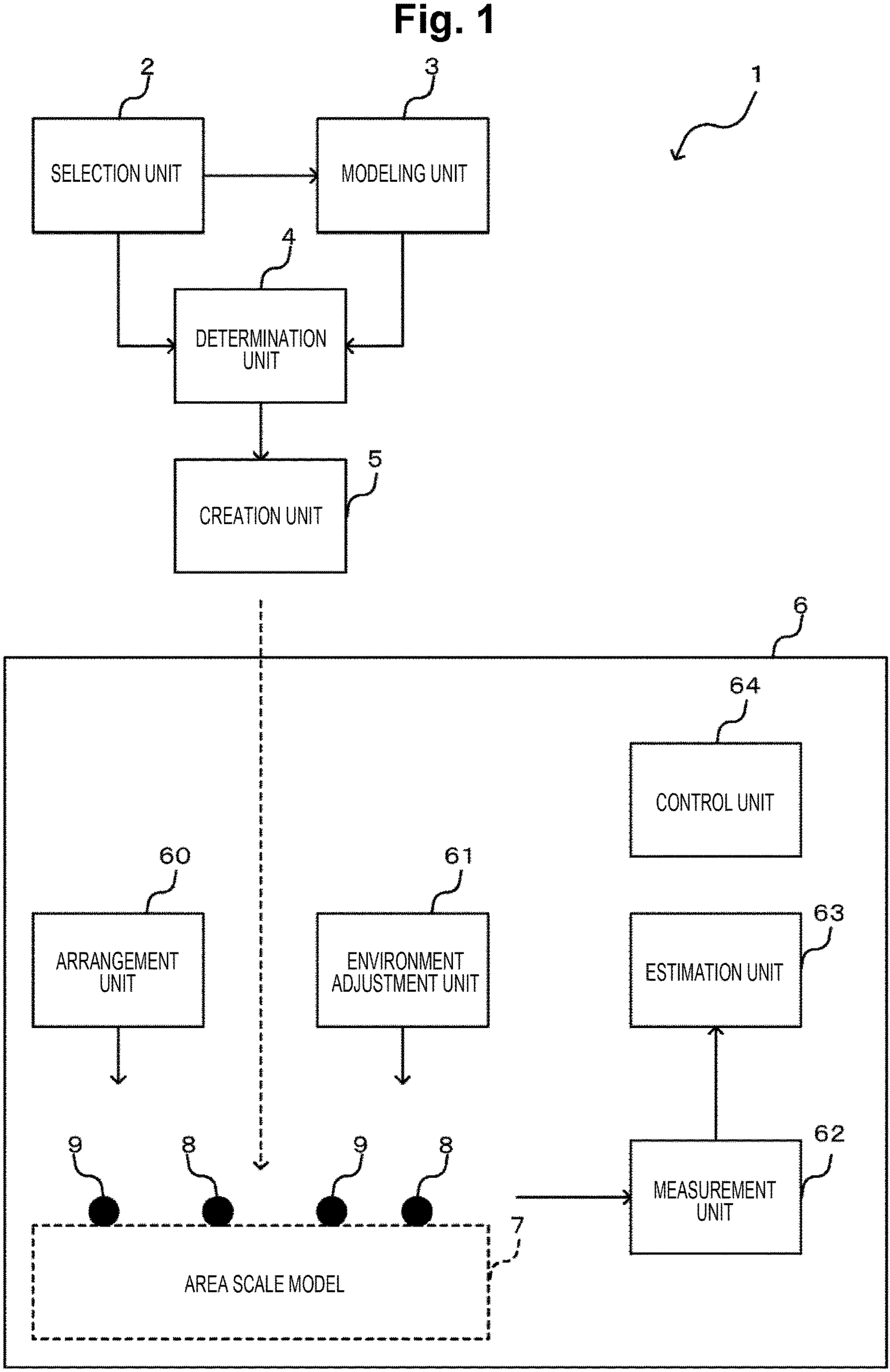
FIG. 1 is a diagram illustrating an outline of a configuration of a propagation model estimation system according to an embodiment.

Hereinbelow, a propagation model estimation system according to an embodiment will be described with reference to the drawings. FIG. 1 is a diagram illustrating an outline of a configuration of a propagation model estimation system 1 according to an embodiment.

As illustrated in FIG. 1, the propagation model estimation system 1 includes, for example, a selection unit 2, a modeling unit 3, a determination unit 4, a creation unit 5, and a propagation model estimation device 6.

The selection unit 2 selects an area for which a radio wave propagation model is to be estimated, and outputs the area to the modeling unit 3 and the determination unit 4.

The modeling unit 3 models a radio wave reflection characteristic in the area selected by the selection unit 2, and outputs the modeled result to the determination unit 4.

The determination unit 4 determines a scale ratio of the area selected by the selection unit 2, a frequency scale model based on the scale ratio, and at least one material based on the radio wave reflection characteristic modeled by the modeling unit 3 and the frequency scale model, and outputs the determined result to the creation unit 5.

The scale ratio of the area is set with the size of an area scale model 7 (described below) created by the creation unit 5 as an upper limit. In addition, the frequency scale model is a reciprocal of the scale ratio of the area or the like.

The creation unit 5 creates the area scale model 7 in which a structure in the area selected by the selection unit 2 is reduced at the aforementioned scale ratio using the at least one material determined by the determination unit 4 by means of a not-illustrated 3D printer or the like.

Figure 2:
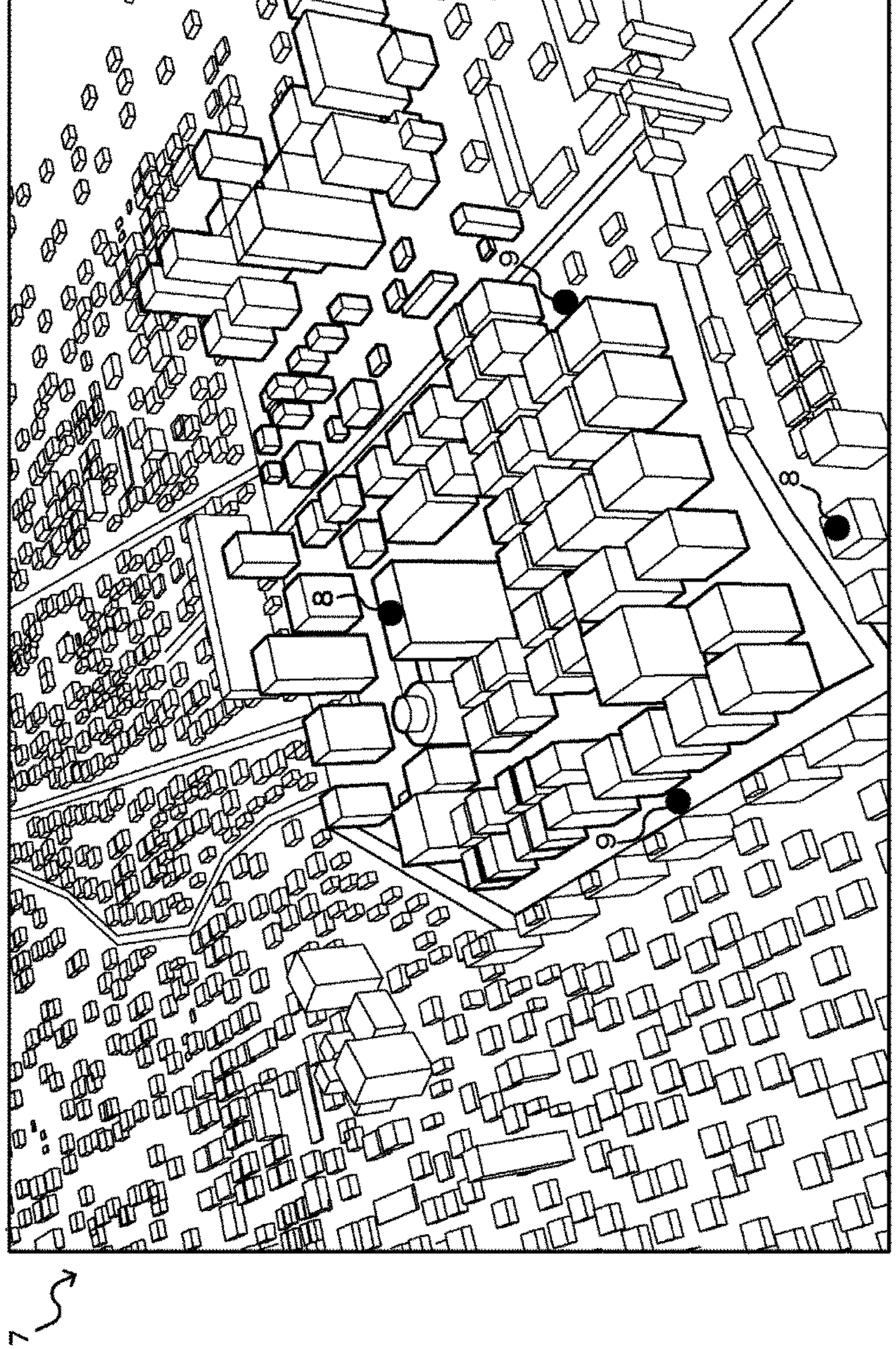
FIG. 2 is a diagram illustrating an area scale model.

FIG. 2 is a diagram illustrating the area scale model 7. The area scale model 7 is, for example, a miniature model of an area such as an urban area selected by the selection unit 2. Note that FIG. 2 illustrates a state after a plurality of transmitting stations 8 (corresponding to base stations) and receiving stations 9 (corresponding to terminal stations) described below are arranged.

Figure 3:
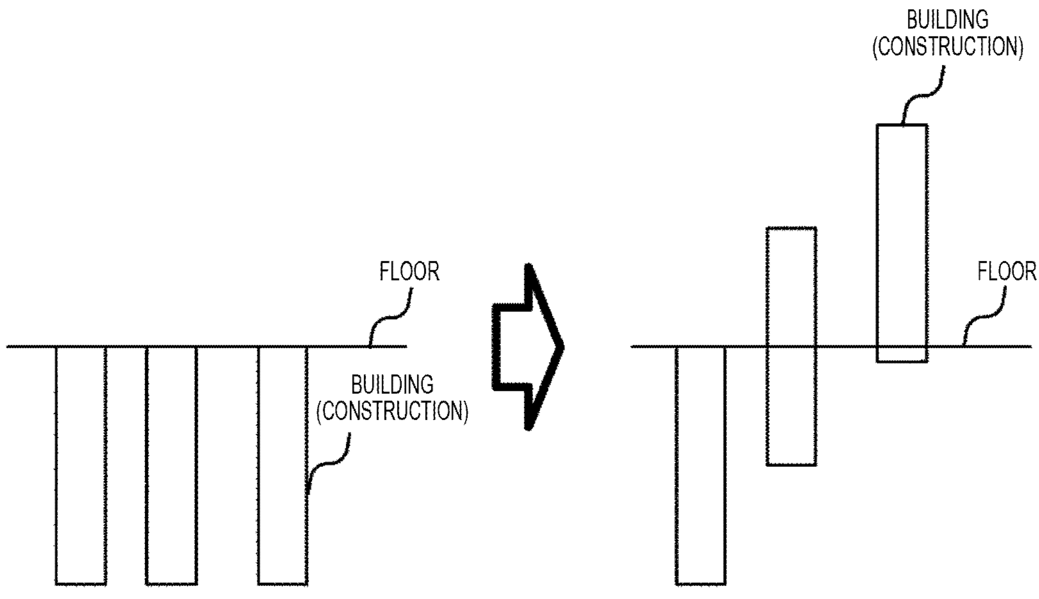
FIG. 3 is a diagram schematically illustrating a part of a structure of the area scale model.

Furthermore, the area scale model 7 may be configured integrally, or as illustrated in FIG. 3, so that a part of the structure (a building, a construction, or the like) moves or changes with respect to the floor, for example.

The creation unit 5 creates the area scale model 7 using data such as point cloud data and a 3D map of the area selected by the selection unit 2. In addition, the creation unit 5 creates the area scale model 7 by means of a 3D printer or the like using building wall surface material information indicating a material for a wall surface or the like of a building included in the area scale model 7, for example.

In the area scale model 7, a reflector that performs freely-selected reflection may be attachable, or the radio wave reflection characteristic may be changeable by filling the inside or the periphery of a predetermined range with a substance having different reflectance such as liquid. In addition, the area scale model 7 may be configured such that a predetermined range is surrounded by a dark room or the like to suppress unnecessary reflection.

Further, in the area scale model 7, a predetermined range (for example, a range around the center) may be set as an effective area, and only the inside of the effective area may be used. The reason for this is that the edge portion of the area scale model 7 may have low creation accuracy.

The propagation model estimation device 6 includes an arrangement unit 60, an environment adjustment unit 61, a measurement unit 62, an estimation unit 63, and a control unit 64, and includes the area scale model 7 created by the creation unit 5, and the plurality of transmitting stations 8 and the plurality of receiving stations 9 arranged in the area scale model 7.

The arrangement unit 60 includes, for example, a not-illustrated robot arm, and arranges, in the area scale model 7, at least one transmitting station 8 that transmits a radio wave based on the frequency scale model and at least one receiving station 9 that receives the radio wave transmitted by the transmitting station 8 while moving.

The environment adjustment unit 61 causes pseudo rain to fall and adjusts humidity in the area scale model 7. For example, the environment adjustment unit 61 adjusts an environment by performing at least one of droplet dropping and humidity adjustment in the area scale model 7.

The measurement unit 62 measures a propagation characteristic of a radio wave received by each of the receiving stations 9 moving in the area scale model 7, and outputs a measurement result to the estimation unit 63.

The estimation unit 63 estimates a radio wave propagation model on the basis of the propagation characteristic of the radio wave measured by the measurement unit 62. Furthermore, the estimation unit 63 may display the estimation result on a not-illustrated display device or the like.

The control unit 64 controls each of the units constituting the propagation model estimation device 6. For example, the control unit 64 may control the area scale model 7 so that a part of the structure in the area selected by the selection unit 2 moves or changes.

Each of the transmitting stations 8 and the receiving stations 9 may be provided with a switch (not illustrated) or the like for switching on/off of transmission and reception of a radio wave. In this case, the control unit 64 may control a radio wave propagation state of each of the transmitting stations 8 and the receiving stations 9 arranged in the area scale model 7 by controlling the switch for each of the transmitting stations 8 and the receiving stations 9.

Note that the receiving station 9 is, for example, a terminal or the like and moves over the area scale model 7, but only an antenna may be arranged over the area scale model 7. Furthermore, the transmitting station 8 may be configured by a drone or the like and provided to move.

Figure 4:
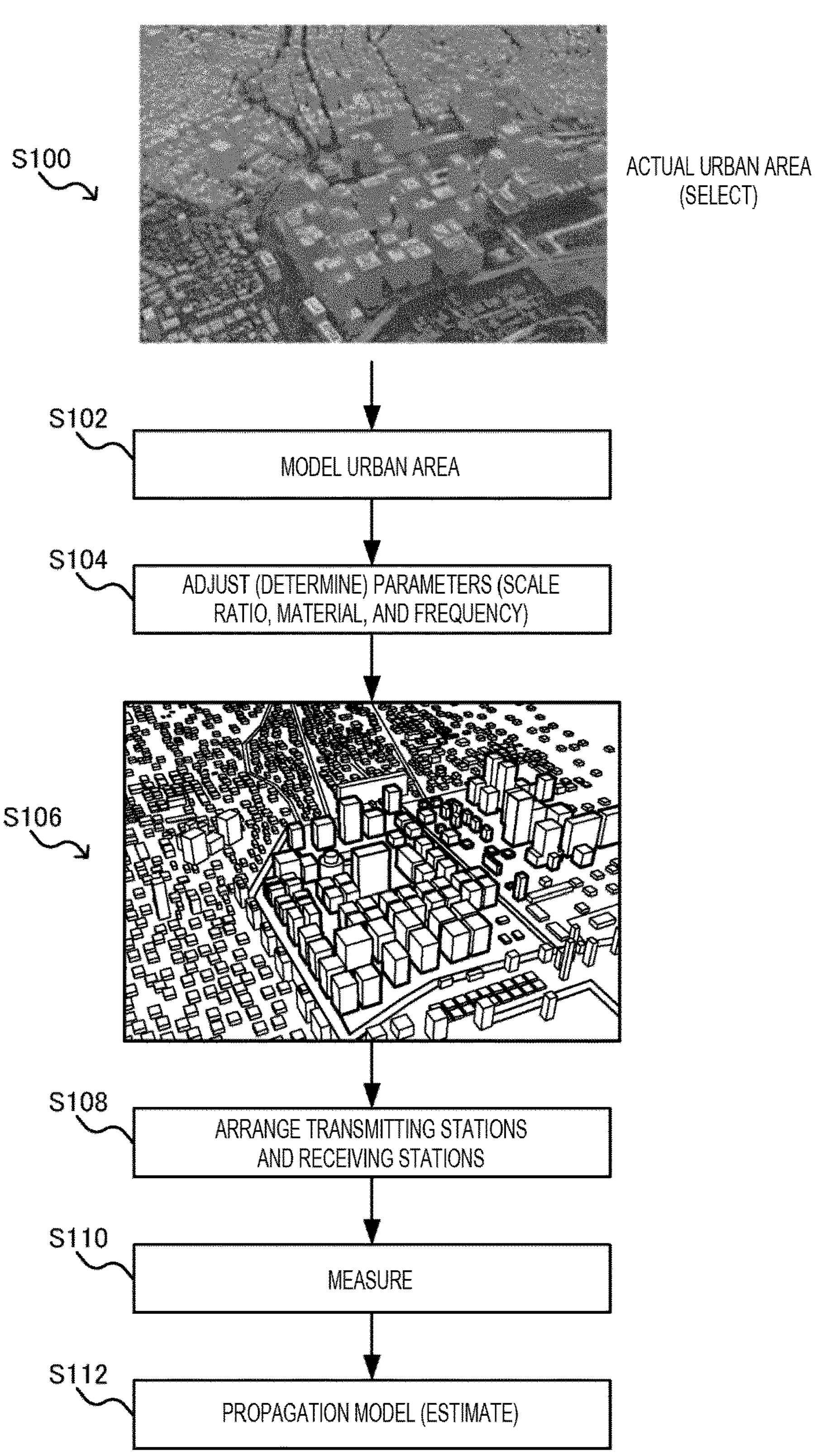
FIG. 4 is a flowchart illustrating an operation example (and a propagation model estimation method) of the propagation model estimation system.

Next, an operation example (and a propagation model estimation method) of the propagation model estimation system 1 will be described. FIG. 4 is a flowchart illustrating an operation example (and a propagation model estimation method) of the propagation model estimation system 1.

As illustrated in FIG. 4, the propagation model estimation system 1 selects an area for which the selection unit 2 estimates a radio wave propagation model from an actual urban area or the like (S100).

The modeling unit 3 models a radio wave reflection characteristic in the area of the urban area or the like selected by the selection unit 2 (S102).

The determination unit 4 adjusts (determines) parameters such as the scale ratio, the material constituting the area scale model 7, and the frequency to be used (S104).

The creation unit 5 creates the area scale model 7 of the area selected by the selection unit 2 using at least one material determined by the determination unit 4 by a not-illustrated 3D printer or the like (S106).

In the propagation model estimation device 6, the arrangement unit 60 arranges at least one transmitting station 8 and at least one receiving station 9 in the area scale model 7 under the control of the control unit 64 (S108).

The measurement unit 62 measures a propagation characteristic of a radio wave transmitted by the transmitting station 8 and received by the receiving station 9 over the area scale model 7 (S110).

The estimation unit 63 estimates a radio wave propagation model on the basis of the propagation characteristic of the radio wave measured by the measurement unit 62 (S112).

In this manner, since the propagation model estimation system 1 measures the propagation characteristic of the radio wave using the area scale model 7 created by the creation unit 5, the propagation model estimation system 1 can easily and accurately estimate the propagation model. That is, the propagation model estimation system 1 can significantly shorten the creation time of the area scale model 7 as compared with the creation time of a conventional scale model, and can enhance the estimation accuracy of the propagation model by adaptively using a plurality of materials having different radio wave reflection characteristics.

Note that some or all of the units constituting the propagation model estimation system 1 may be configured by hardware such as a programmable logic device (PLD) and a field programmable gate array (FPGA), or may be configured as a program executed by a processor such as a CPU.

For example, each of the units constituting the propagation model estimation system 1 can be achieved by using a computer and a program, and the program can be recorded in a storage medium or provided through a network.

REFERENCE SIGNS LIST

- 1 Propagation model estimation system
- 2 Selection unit
- 3 Modeling unit
- 4 Determination unit
- 5 Creation unit
- 6 Propagation model estimation device
- 7 Area scale model
- 8 Transmitting station
- 9 Receiving station
- 60 Arrangement unit
- 61 Environment adjustment unit
- 62 Measurement unit
- 63 Estimation unit
- 64 Control unit

The invention claimed is:

1. A propagation model estimation system comprising:

selection circuitry configured to select an area for which a radio wave propagation model is to be estimated;

modeling circuitry configured to model a radio wave reflection characteristic in the area selected by the selection circuitry;

determination circuitry configured to determine a scale ratio of the area selected by the selection circuitry, a frequency scale model based on the scale ratio, and at least one material based on the radio wave reflection characteristic modeled by the modeling circuitry and the frequency scale model;

creation circuitry configured to create an area scale model in which a structure in the area selected by the selection circuitry is reduced at the scale ratio using the material by means of a 3D printer;

arrangement circuitry configured to arrange, in the area scale model, at least one transmitting station that transmits a radio wave based on the frequency scale model and at least one receiving station that receives the radio wave transmitted by the transmitting station while moving;

measurement circuitry configured to measure a propagation characteristic of the radio wave received by each of the receiving stations moving in the area scale model; and estimation circuitry configured to estimate the radio wave propagation model on a basis of the propagation characteristic of the radio wave measured by the measurement circuitry.

2. The propagation model estimation system according to claim 1, further comprising:

environment adjustment circuitry configured to adjust an environment by performing at least one of droplet dropping and humidity adjustment in the area scale model.

3. The propagation model estimation system according to claim 1, wherein, in the area scale model, a part of a structure in the area selected by the selection circuitry moves or changes.

4. The propagation model estimation system according to claim 1, wherein, in the area scale model, the radio wave reflection characteristic is changeable.

5. A propagation model estimation device comprising:

arrangement circuitry configured to arrange in an area scale model created by reducing a structure in an area selected as a target for which a radio wave propagation model is to be estimated at a scale ratio using a predetermined material by means of a 3D printer, at least one receiving station that receives, while moving, a radio wave transmitted by at least one transmitting station that transmits the radio wave based on a frequency scale model corresponding to the scale ratio;

measurement circuitry configured to measure a propagation characteristic of the radio wave received by each of the receiving stations moving in the area scale model; and estimation circuitry configured to estimate the radio wave propagation model on a basis of the propagation characteristic of the radio wave measured by the measurement circuitry.

6. A propagation model estimation method comprising:

selecting an area for which a radio wave propagation model is to be estimated;

modeling a radio wave reflection characteristic in the selected area;

determining a scale ratio of the selected area, a frequency scale model based on the scale ratio, and at least one material based on the modeled radio wave reflection characteristic and the frequency scale model;

creating an area scale model in which a structure in the selected area is reduced at the scale ratio using the material by means of a 3D printer;

arranging, in the area scale model, at least one transmitting station that transmits a radio wave based on the frequency scale model and at least one receiving station that receives the radio wave transmitted by the transmitting station while moving;

measuring a propagation characteristic of the radio wave received by each of the receiving stations moving in the area scale model; and estimating the radio wave propagation model on a basis of the measured propagation characteristic of the radio wave.

* * * * *